US010694484B2

(12) United States Patent
Kunz et al.

(10) Patent No.: US 10,694,484 B2
(45) Date of Patent: Jun. 23, 2020

(54) COMMUNICATION SYSTEM FOR SUPPORTING INBOUND ROAMER USER EQUIPMENT

(71) Applicant: NEC Laboratories Europe GmbH, Heidelberg (DE)

(72) Inventors: Andreas Kunz, Ladenburg (DE); Genadi Velev, Darmstadt (DE); Iskren Ianev, Lower Earley (GB); Filipe Alexandre-Rodrigues de Moura Leitao, Heidelberg (DE)

(73) Assignee: NEC LABORATORIES EUROPE GMBH, Heidelberg (DE)

( * ) Notice: Subject to any disclaimer, the term of this patent is extended or adjusted under 35 U.S.C. 154(b) by 0 days.

(21) Appl. No.: 15/771,975

(22) PCT Filed: Oct. 28, 2016

(86) PCT No.: PCT/EP2016/076177
§ 371 (c)(1),
(2) Date: Apr. 27, 2018

(87) PCT Pub. No.: WO2017/072349
PCT Pub. Date: May 4, 2017

(65) Prior Publication Data
US 2018/0352528 A1    Dec. 6, 2018

(30) Foreign Application Priority Data

Oct. 28, 2015  (EP) .................................... 15191978

(51) Int. Cl.
*H04W 4/00*    (2018.01)
*H04W 60/00*    (2009.01)
(Continued)

(52) U.S. Cl.
CPC ......... *H04W 60/00* (2013.01); *H04L 65/1016* (2013.01); *H04L 65/1073* (2013.01);
(Continued)

(58) Field of Classification Search
None
See application file for complete search history.

(56) References Cited

U.S. PATENT DOCUMENTS

2007/0281687 A1    12/2007  Jiang
2007/0293216 A1    12/2007  Jiang
(Continued)

OTHER PUBLICATIONS

European Patent Office, International Search Report and the Written Opinion in International Application No. PCT/EP2016/076177 (dated Nov. 30, 2016).

*Primary Examiner* — Suhail Khan
(74) *Attorney, Agent, or Firm* — Leydig, Voit & Mayer, Ltd.

(57) ABSTRACT

A communication apparatus for supporting a registration procedure for an inbound roamer user equipment, 'UE', in a visited public land mobile network, 'VPLMN' that includes a transceiver and a controller. The controller is configured to: control the transceiver to receive, from a communicator of the VPLMN, a request for authentication information; retrieve the authentication information from a communicator of a home public land mobile network, 'HPLMN'; and control the transceiver to transmit the authentication information to the serving CSCF of the VPLMN for use in the registration procedure.

10 Claims, 10 Drawing Sheets

(51) Int. Cl.
  *H04W 12/06* (2009.01)
  *H04W 4/24* (2018.01)
  *H04L 29/06* (2006.01)
  *H04W 8/12* (2009.01)
  *H04M 15/00* (2006.01)
  *H04W 8/06* (2009.01)
  *H04W 84/04* (2009.01)

(52) U.S. Cl.
  CPC ....... *H04M 15/57* (2013.01); *H04M 15/8038* (2013.01); *H04M 15/8228* (2013.01); *H04W 4/24* (2013.01); *H04W 8/12* (2013.01); *H04W 12/06* (2013.01); *H04W 8/06* (2013.01); *H04W 84/042* (2013.01)

(56) References Cited

U.S. PATENT DOCUMENTS

| | | | |
|---|---|---|---|
| 2012/0039312 A1* | 2/2012 | Narkar | H04W 4/025 370/338 |
| 2014/0355520 A1 | 12/2014 | Wallis | |
| 2014/0378105 A1* | 12/2014 | Suryavanshi | H04L 51/18 455/414.1 |
| 2015/0118995 A1 | 4/2015 | Aksu et al. | |

* cited by examiner

COMMUNICATION SYSTEM FOR SUPPORTING INBOUND ROAMER USER EQUIPMENT

CROSS-REFERENCE TO RELATED APPLICATIONS

This application is a U.S. National Phase application under 35 U.S.C. § 371 of International Application No. PCT/EP2016/076177, filed Oct. 28, 2016, and claims benefit to European Patent Application No. EP 15191978.4, filed on Oct. 28, 2015. The International Application was published in English on May 4, 2017 as WO 2017/072349 A1 under PCT Article 21(2).

FIELD

The present invention relates to mobile communication devices and networks.

BACKGROUND

In a mobile (cellular) communications network, (user) communication devices (also 10 known as user equipment (UE), for example mobile telephones) communicate with remote servers or with other communication devices via base stations. The type of connections that such user equipment may have with the network include: circuit switched (CS) connections, mainly used for voice calls and/or the like; and packet switched (PS) connections, for communicating data packets (e.g. IP packets). Each base station is connected to a core network (such as an IMS or an EPC network), which is in turn connected to other networks for providing end-to-end connectivity for the users.

3GPP specified the IP Multimedia Core Network Subsystem—often referred to as the IP Multimedia Subsystem (IMS)—for enabling IP-based multimedia services for user equipment. A so-called Proxy Call Session Protocol Function (P-CSCF) of an IMS is responsible for exchanging Session Initiation Protocol (SIP) signaling with UEs connected to the IMS. The P-CSCF stores respective UE security and IP session parameters for each connected UE in order to facilitate appropriate encryption of SIP signaling exchanged between a particular UE and the P-CSCF. The P-CSCF is also responsible for authorising the resources necessary for the IP session for each UE and for forwarding messages to and from a next hop CSCF that is appropriate for a particular UE (determined during the registration process performed for that UE).

IMS is specified in 3GPP Technical Specification (TS) 23.228 V13.4.0 and the Session Initiation Protocol (V2.0) is specified in RFC 3261 by the Internet Engineering Task Force (IETF), the contents of which documents are incorporated herein by reference.

IMS Centralized Services (ICS) was specified in 3GPP from Release 8 onwards in several specifications. There are two basic approaches in order to execute supplementary services in IMS for user equipment (UE) that are still using a legacy circuit switched (CS) access towards its Mobile Switching Centre (MSC). One approach is based on enhancements to the MSC, i.e. by making the MSC able to act as a SIP User Agent on behalf of the UE. This approach is illustrated in FIG. 1. The other, slightly less preferred approach requires enhancing the operation of the UE in order to make it capable to interact with the Application Server (AS) directly (i.e. without requiring support from the MSC and/or the IMS).

Current solutions include variations of different levels of support of IMS and ICS features in the network (in combination with other networks, if appropriate). One of the more popular options is the so-called MSC-Server (or 'MSC-S') that allows operators to move away from the legacy CS network towards IMS and thus be able to offer IMS services even to legacy UE subscribers. Effectively, the MSC-S is a core network element which controls call switching and mobility management functions for mobile phones roaming in a network of base stations. The MSC-S can also be referred to as an 'MSC Server', an 'MSS', or an 'MTS-U'. Further details on the ICS may be found in: 3GPP TS 23.060 V13.4.0; 3GPP TS 23.228 V13.4.0; 3GPP TS 23.292 V13.2.0; and GSMA IR.64 V12.0, the contents of which documents are incorporated herein by reference.

When a UE is connected to an (ICS capable) MSC-S using legacy CS protocols, the MSC-S connects to the appropriate IMS entities, e.g. an Application Server (AS) and a CSCF, for handling SIP signaling for the UE. The MSC-S also connects to a Media Gateway for transcoding the CS codecs used by the UE into appropriate IMS codecs. If the UE is a roaming UE, then the MSC-S in the visited network also contacts the home location register (HLR) of the home network in order to download the subscription profile into the visited location register (VLR).

However, some operators would like to remove CS components from their core network completely and/or move support for legacy CS interactions to the edge of their network. This need is mentioned in, for example, 3GPP Tdocs no. S2-143750 and S2-153652 (both titled "New Work Item Description on Service Domain Centralization"), although this need hasn't been addressed in 3GPP standards yet.

SUMMARY

Embodiments provide a communication apparatus for supporting a registration procedure for an inbound roamer user equipment, 'UE', in a visited public land mobile network, 'VPLMN'. The communication apparatus may include a transceiver and a controller. The controller is configured to: control the transceiver to receive, from a communicator of the VPLMN, a request for authentication information; retrieve the authentication information from a communicator of a home public land mobile network, 'HPLMN'; and control the transceiver to transmit the authentication information to the communicator of the VPLMN for use in the registration procedure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
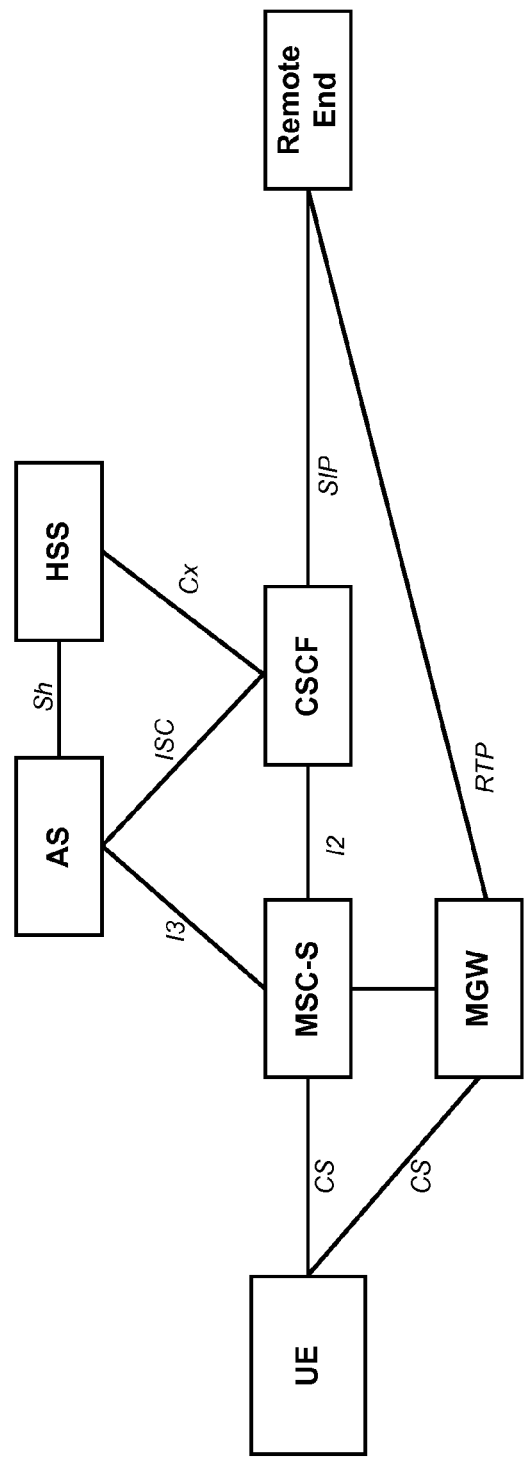
FIG. 1 illustrates a generic ICS architecture.

The present invention relates to mobile communication devices and networks, particularly but not exclusively those operating according to the 3rd Generation Partnership Project (3GPP) standards or equivalents or derivatives thereof, such as the Long Term Evolution (LTE) of the Evolved Packet Core (EPC) network. The invention has particular although not exclusive relevance to the provision of Internet Protocol (IP) Multimedia Subsystem (IMS) services, such as IMS Centralized Services (ICS), for inbound roamers without an IMS home network.

The inventors have realized that, in the absence of CS components and/or support for legacy CS interactions in some (home) networks, visited network operators may be unable to offer inbound roaming services for those subscribers (of other networks) that do not have IMS subscriptions, or whose (home) network does not support IMS nor has any service level agreement on IMS with the visited network. In other words, there is an issue as to how to offer inbound roaming services in a visited network for subscribers of a home network which does not support any ICS/IMS, nor has IMS subscriptions nor has any service level agreement on IMS with the visited network.

Accordingly, preferred embodiments of the present invention aim to provide methods and apparatus which overcome or at least partially alleviate the above issues.

In a first aspect, the invention provides communication apparatus for supporting a registration procedure for an inbound roamer user equipment (UE) in a visited public land mobile network (VPLMN), the communication apparatus comprising: a transceiver and a controller wherein the controller is configured to: control the transceiver to receive, from a communication entity (or communicator) of the VPLMN, a request for authentication information; retrieve the authentication information from a communication entity (or communicator) of a home public land mobile network (HPLMN); and control the transceiver to transmit the authentication information to the communication entity of the VPLMN for use in said registration procedure.

In a second aspect, the invention provides communication apparatus for registering an inbound roamer user equipment (UE) in a visited public land mobile network (VPLMN), the communication apparatus comprising: a transceiver and a controller wherein the controller is configured to: control the transceiver to transmit, towards an interworking function of the VPLMN, a request for authentication information; and control the transceiver to receive the authentication information from the interworking function for use in registering the inbound roamer user.

Aspects of the invention extend to corresponding systems, methods, and computer program products such as computer readable storage media having instructions stored thereon which are operable to program a programmable processor to carry out a method as described in the aspects and possibilities set out above or below and/or to program a suitably adapted computer to provide a apparatus performing the functions described herein.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Figure 2:
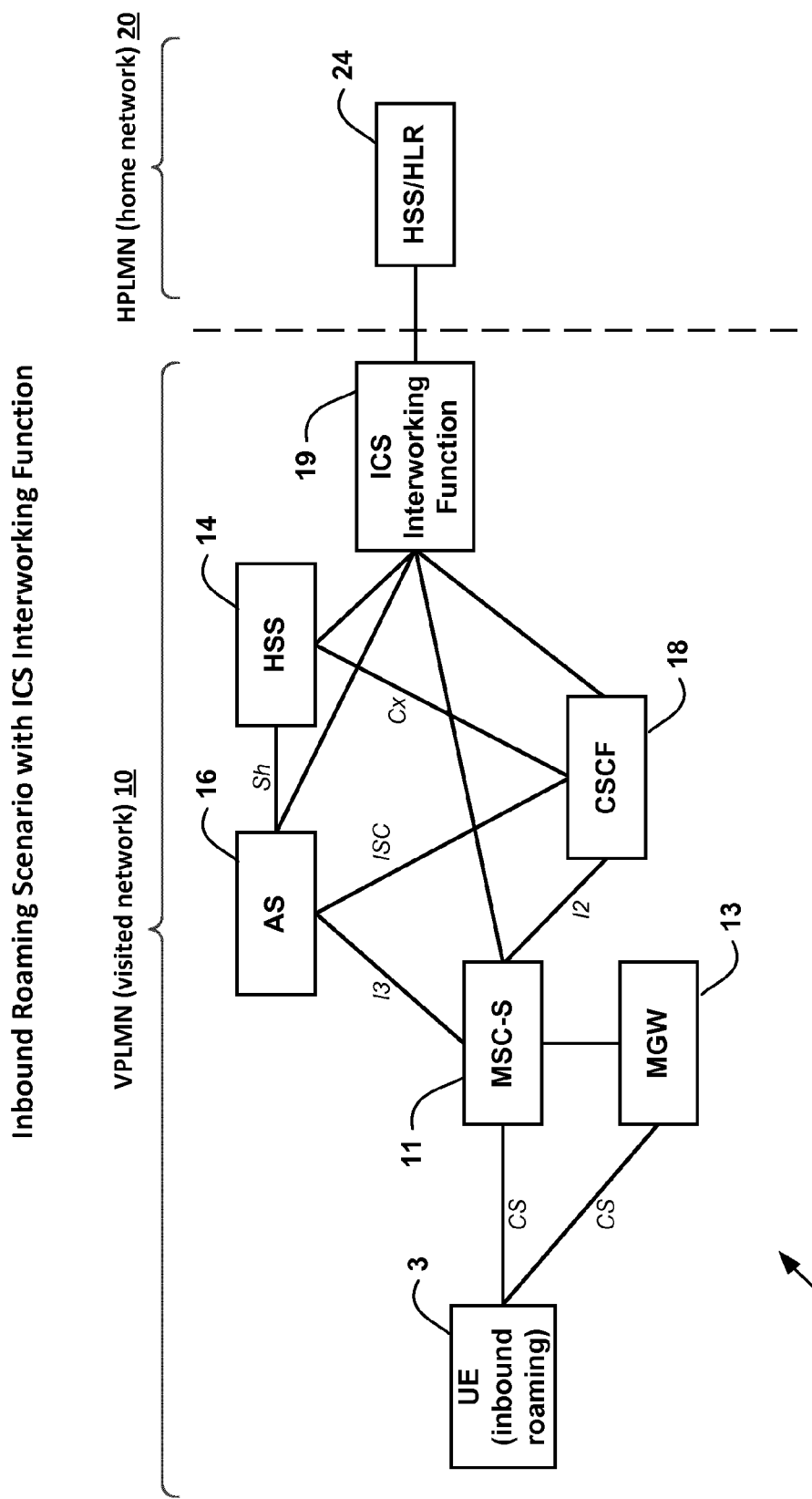
FIG. 2 a mobile (cellular) telecommunication system of a type to which embodiments of the invention are applicable.

FIG. 2 schematically illustrates a mobile (cellular) telecommunication network 1 in which users of mobile devices (such as UE 3) can communicate with each other and other users via base stations and a core network using an appropriate radio access technology (RAT), e.g. E-UTRA and/or the like. As those skilled in the art will appreciate, whilst one mobile device 3 is shown in FIG. 1 for illustration purposes, the system, when implemented, will typically include other mobile devices.

As can be seen the network 1 includes a visited public land mobile network (VPLMN) 10 part in which the mobile device 3 is currently roaming and a home public land mobile network (HPLMN) 20 part to which the mobile device 3 is a subscriber. In the following, the HPLMN is simply referred to as the home network 20 and the VPLMN is referred to as the visited network 10 (of the mobile device 3).

In this example, the visited network 10 supports ICS (and hence the mobile device 3 is expected to communicate with the visited network 10 using ICS and/or IMS technologies, e.g. using a circuit switched (CS) connection). It will be appreciated that the mobile device 3 may comprise an IMS (LTE) UE although in this case the mobile device 3 employs a CS connection to access the visited network 10.

On the other hand, the home network 20 in this example does not support the ICS and/or IMS supported by the visited network 10. For example, the home network 20 may support an LTE core network (without circuit switched components), which may also be referred to as the enhanced packet core (EPC) network. However, it will be appreciated that the home network 20 may comprise any non-ICS or non-IMS network, if appropriate.

The visited network 10 includes, amongst others, one or more base stations (referred to as 'eNBs' in LTE—not shown in FIG. 2), a mobile switching centre server (MSC-S) 11, a media gateway (MGW) 13, a home subscriber server (HSS) 14, an application server (AS) 16, a CSCF 18, and an ICS interworking function (ICS IWF) 19. As shown, the nodes of the visited network 10 are coupled to each other using appropriate (standard) interfaces. The interfaces (reference points) shown in FIG. 2 may comprise updated existing reference points (e.g. i3, ISC, Cx, Mw, Sh, I2, etc.) depending on the protocol of choice and the collocated functionality of the ICS IWF 19.

The mobile device 3 and its serving base station are connected via an appropriate air interface (e.g. an LTE air interface, such as the "Uu" interface), and thus the mobile device 3 is connected to the MSC-S 11 using a circuit switched (CS) connection (via the serving base station). The mobile device 3 is thus able to connect to other nodes of the visited network 10 via its serving base station and the MSC-S 11.

The home network 20 includes, amongst others, a home subscriber server (HSS)/home location register (HLR) 24.

Although not shown, the HSS/HLR is also connected to other home network nodes using appropriate (standard) interfaces.

The MSC-S 11 is responsible for managing call setup and mobility (in the visited network 10) for mobile devices 3 served by base stations connected to this MSC-S 11. The MSC-S 11 interfaces with the AS 16 and the CSCF 18 for conveying SIP signaling between the mobile device 3 and the AS 16 and/or the CSCF 18.

The MGW 13 is responsible for transcoding between the codecs (if different) used by the mobile device 3 and a remote endpoint in communication with the mobile device 3.

The HSS 14 is responsible for storing and managing subscriber data, e.g. subscription information/subscription profiles for subscribers of the visited network 10. Similarly, the HSS/HLR 24 is responsible for storing and managing subscriber data for subscribers of the home network 20 (in this example, the mobile device 3). Beneficially, since the visited network 10 includes the ICS IWF 19 (which will be described in detail later), there is no need to implement a home location register functionality is the visited network 10 (e.g. in the MSC-S 11).

The AS 16 is responsible for end-to-end communications between (an appropriate application in) the mobile device 3 and a corresponding application hosted by the AS 16 (and/or a node connected to it). The CSCF 18 is a SIP server that implements IMS call session control functionality for the mobile device 3. The CSCF 18 may be configured as at least one of: a Proxy CSCF (P-CSCF); an Interrogating CSCF (I-CSCF); and a Serving CSCF (S-CSCF). The CSCF 18 also supports the DIAMETER protocol (denoted 'Cx' in FIG. 2) for communicating with the HSS 14. As those skilled in the art will appreciate, whilst one AS 16 and one CSCF 18 are shown in FIG. 2 for illustration purposes, the system, when implemented, will typically include other application servers and CSCFs.

If a network (in this case, the HPLMN 20) does not support ICS or IMS, then its subscribers (e.g. the mobile device 3) roaming in another PLMN (such as the VPLMN 10) require the serving MSC-S 11 of that PLMN to contact the HLR 24 of the HPLMN 10 in order to download the subscription profile into the VLR function (of the MSC-S 11). However, since in the example shown in FIG. 2 the operator of the visited network 10 has removed all CS functionality from the core network, the serving MSC-S 11 in the visited network 10 does not have VLR functionality.

Figure 3:
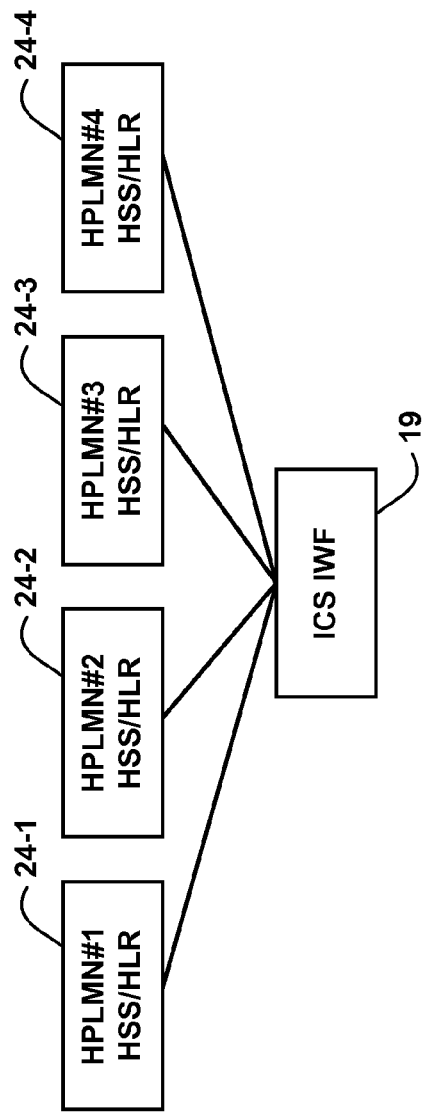
FIG. 3 connectivity to external networks via the ICS IWF of FIG. 2.

Instead, in the visited network 10 the ICS IWF 19 is provided in order to facilitate interworking with other networks without having to provide VLR functionality in the MSC-S 11. In more detail, the ICS IFW 19 is responsible for interworking with nodes of other networks, such as the HSS/HLR 24, in order to facilitate inbound roaming for subscribers of other networks (in this example, the mobile device 3 of HPLMN 20) into the visited network 10 (and potentially to facilitate outbound roaming for subscribers of the VPLMN network into other networks). It will be appreciated that the ICS IWF 19 may be coupled to respective HSS/HLRs of more than one PLMN (for example, as shown in FIG. 3) for providing an interworking function between CS signaling and other protocols used in the ICS network. Beneficially, the ICS IFW 19 is configured to act as a VLR towards the home network 20 of inbound roaming subscribers (the mobile device 3 in this example) and handles CS authentication and/or third party registration related messages for granting the mobile device 3 access to the visited network 10 in a protocol independent manner. Depending on its configuration, the ICS IFW 19 may act as a VLR or an HSS towards the MSC-S 11, it may act as an AS or an HSS towards the S-CSCF 18, and it may act as an AS towards the HSS 14.

As shown in FIG. 2, when the mobile device 3 is roaming into the VPLMN 10, it is connected with legacy CS protocols to the MSC-S 11. The MSC-S 11 is coupled to other IMS entities such as the AS 16 and the CSCF 18 for SIP signaling. The mobile device 3 and the MSC-S 11 are also coupled via the Media Gateway 13 (which is connected to the mobile device 3 with legacy CS protocols) for transcoding of the CS codecs into appropriate IMS codecs. It will be appreciated that the remote endpoint (that the mobile device 3 attempts to communicate with) may be a pure IMS UE and/or the like.

Thus, in this system, the mobile device 3 which belongs to a non-ICS capable home network 20 is able to roam into the ICS enabled visited network 10. In this example, registration to the visited network is initiated by the mobile device 3 by sending a Location Update Request message to the MSC-S 11 and including in this message its associated International Mobile Subscriber Identifier (IMSI) and a Location Area Identifier (LAI) associated with the area (cell) where the mobile device 3 is currently located. Based on the IMSI, the MSC-S 11 determines that the mobile device 3 belongs to the home network 20 (i.e. the mobile device 3 is a roaming UE). Therefore, the MSC-S 11 contacts the ICS IWF 19 (which is acting as a VLR for the home network 20) in order to assist with carrying out an appropriate CS authentication for the mobile device 3.

The ICS IWF 19 is configured to retrieve the necessary CS authentication data from the HSS/HLR 24 (using, for example, conventional VLR-HLR procedures) and returns the appropriate authentication parameters to the MSC-S 11, either directly or via the CSCF 18 (configured as an S-CSCF). Using the returned authentication parameters, the MSC-S 11 is able to trigger a CS authentication procedure for the mobile device 3. This procedure typically includes the MSC-S 11 sending a 'RAND' value (a random number received form the HSS/HLR 24 via the ICS IWF 19) to the mobile device 3 and the mobile device 3 computing and returning a corresponding signed response (SRES) to the MSC-S 11.

Once the CS authentication procedure is successful (i.e. when the MSC-S 11, the S-CSCF 18, and/or the ICS IWF 19 determines that the mobile device 3 returned the correct SRES value for the RAND challenge), the ICS IWF 19 sends an Update Location Request with the mobile device's 3 IMSI and Mobile Station Routing Number (MSRN) to the HSS/HLR 24 of the home network 20. The ICS IWF 19 retrieves the CS subscription profile and service settings from the HSS/HLR 24 and maps (converts) the CS subscription profile into an appropriate IMS subscription profile that can be downloaded to MSC-S 11 (and/or the S-CSCF 18). The ICS IWF 19 also generates an appropriate temporary identifier for the mobile device 3, for example, a Temporary Mobile Subscriber Identity (TMSI), and provides it to the MSC-S 11 and the mobile device 3.

Thus, beneficially, the visited network 10 is able to obtain the necessary subscriber data from the home network 20 even without a VLR being in place and without requiring ICS/IMS in the home network 20. Beneficially, the MSC-S 11 is able to perform ciphering of its communication with the mobile device 3 according to normal (CS) procedures. If necessary, the MSC-S 11 also performs a so-called 3rd party registration to the home network 20 (CSCF 18 and/or AS 16).

As can be seen, the above described system provides a number of benefits, including one or more of the following: legacy (CS) UE support, without requiring any change of the protocols or procedures followed by the UE; legacy HLR support of peering network (HPLMN); and no need for a legacy VLR functionality in the MSC server.

Mobile Switching Centre Server

Figure 4:
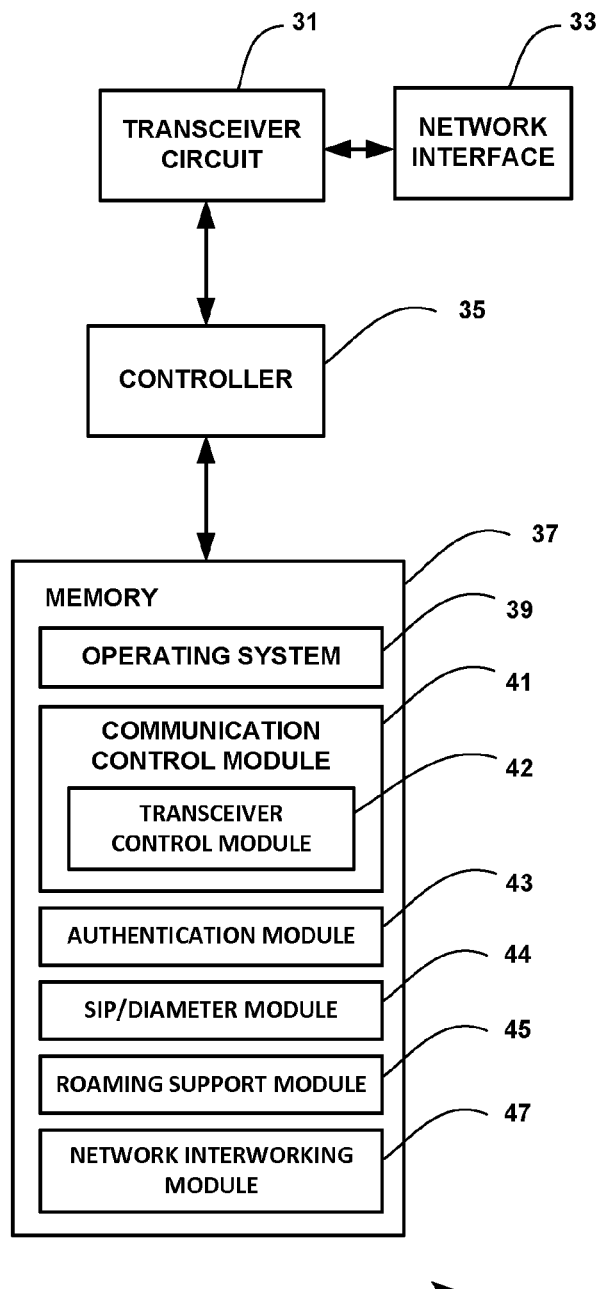
FIG. 4 is an exemplary block diagram illustrating the main functionalities of an MSC-S of the system shown in FIG. 2.

FIG. 4 is a block diagram illustrating the main components of the MSC-S 11 shown in FIG. 2. As shown, the MSC-S 11 has a transceiver circuit 31, and a network interface 33 for transmitting signals to and for receiving signals from other network nodes (such as the mobile device 3 and nodes of the VPLMN 10, such as the ICS IWF 19). The MSC-S 11 has a controller 35 to control the operation of the MSC-S 11. The controller 35 is associated with a memory 37.

Software may be pre-installed in the memory 37 and/or may be downloaded via the communication network 1 or from a removable data storage device (RMD), for example. The controller 35 is configured to control the overall operation of the MSC-S 11 by, in this example, program instructions or software instructions stored within memory 37. As shown, these software instructions include, among other things, an operating system 39, a communications control module 41, an authentication module 43, a SIP/DIAMETER module 44, a roaming support module 45, and a network interworking module 47.

The communications control module 41 controls the communication between the MSC-S 11 and other network entities that are connected to the MSC-S 11 (e.g. the mobile device 3, the MGW 13, the HSS 14 (indirectly), the AS 16, the CSCF 18, and the ICS IWF 19).

The authentication module 43 is responsible for authenticating mobile devices connected to this MSC-S 11 by generating, sending, and receiving appropriately formatted authentication challenges and responses. For example, for CS authentication purposes, the authentication module 43 is configured to send an appropriate RAND value to the mobile device 3 and to receive an SRES back from the mobile device 3 (and forward it to the ICS IWF 19 for comparing the SRES with an SRES obtained from the mobile device's 3 HSS).

The SIP/DIAMETER module 44 is responsible for handling (generating, sending, and receiving) signaling messages formatted in accordance with the Session Initiation and/or the DIAMETER protocol (if applicable). Such SIP/DIAMETER messages may relate to performing third party authentication and registration of the mobile device 3 in the visited network 10.

The roaming support module 45 is responsible for determining whether a particular mobile device 3 connected to this MSC-S 11 belongs to a difference network than the visited network 10.

The network interworking module 47 is responsible for handling (generating, sending, and receiving) signaling messages formatted in accordance with the protocol used over the interface with other networks (e.g. the home network 20). Such signaling messages may include, for example, messages and associated responses for registering and authenticating the mobile device 3 when it is roaming in the visited network 10.

ICS Interworking Function

Figure 5:
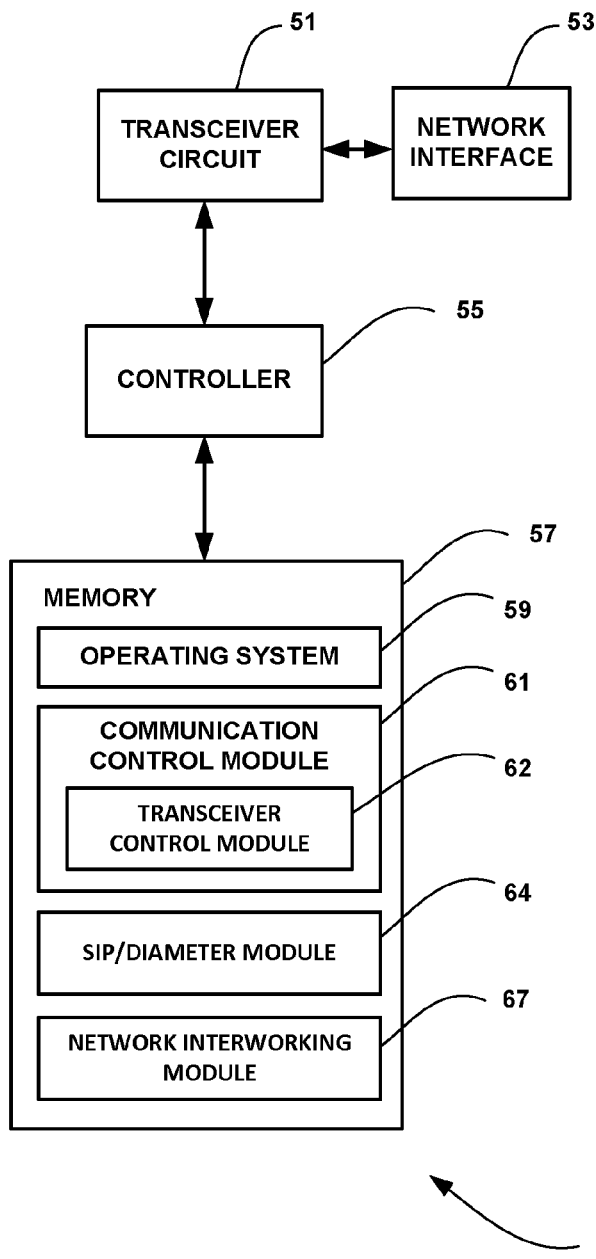
FIG. 5 is an exemplary block diagram illustrating the main functionalities of an ICS IWF of the system shown in FIG. 2.

FIG. 5 is a block diagram illustrating the main components of the ICS IWF 19 shown in FIG. 2. As shown, the ICS IWF 19 has a transceiver circuit 51, and a network interface 53 for transmitting signals to and for receiving signals from other network nodes (such as the MSC-S 11 and the HSS 24). The ICS IWF 19 has a controller 55 to control the operation of the ICS IWF 19. The controller 55 is associated with a memory 57.

Software may be pre-installed in the memory 57 and/or may be downloaded via the communication network 1 or from a removable data storage device (RMD), for example. The controller 55 is configured to control the overall operation of the ICS IWF 19 by, in this example, program instructions or software instructions stored within memory 57. As shown, these software instructions include, among other things, an operating system 59, a communications control module 61, a SIP/DIAMETER module 64, and a network interworking module 67.

The communications control module 61 controls the communication between the ICS IWF 19 and other network entities that are connected to the ICS IWF 19 (e.g. the MSC-S 11, the HSS 14, the application server(s) 16, the CSCF(s) 18, and the HSS/HLR 24 nodes of other networks.).

The SIP/DIAMETER module 64 is responsible for handling (generating, sending, and receiving) signaling messages formatted in accordance with the Session Initiation and/or the DIAMETER protocol (if applicable). Such SIP/DIAMETER messages may relate to performing third party authentication and registration of the mobile device 3 in the visited network 10.

The network interworking module 67 is responsible for handling (generating, sending, and receiving) signaling messages formatted in accordance with the protocol used over the interface with other networks (e.g. the home network 20 of the mobile device 3). Such signaling messages may include, for example, messages and associated responses for retrieving, from the HSS 24, of CS authentication parameters/subscriber profile associated with the mobile device 3 (when it is roaming in the visited network 10).

In the above description, the MSC-S 11 and the ICS IWF 19 are described for ease of understanding as having a number of discrete modules (such as the communications control modules, the network interworking modules, the SIP/DIAMETER modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

Figure 6:
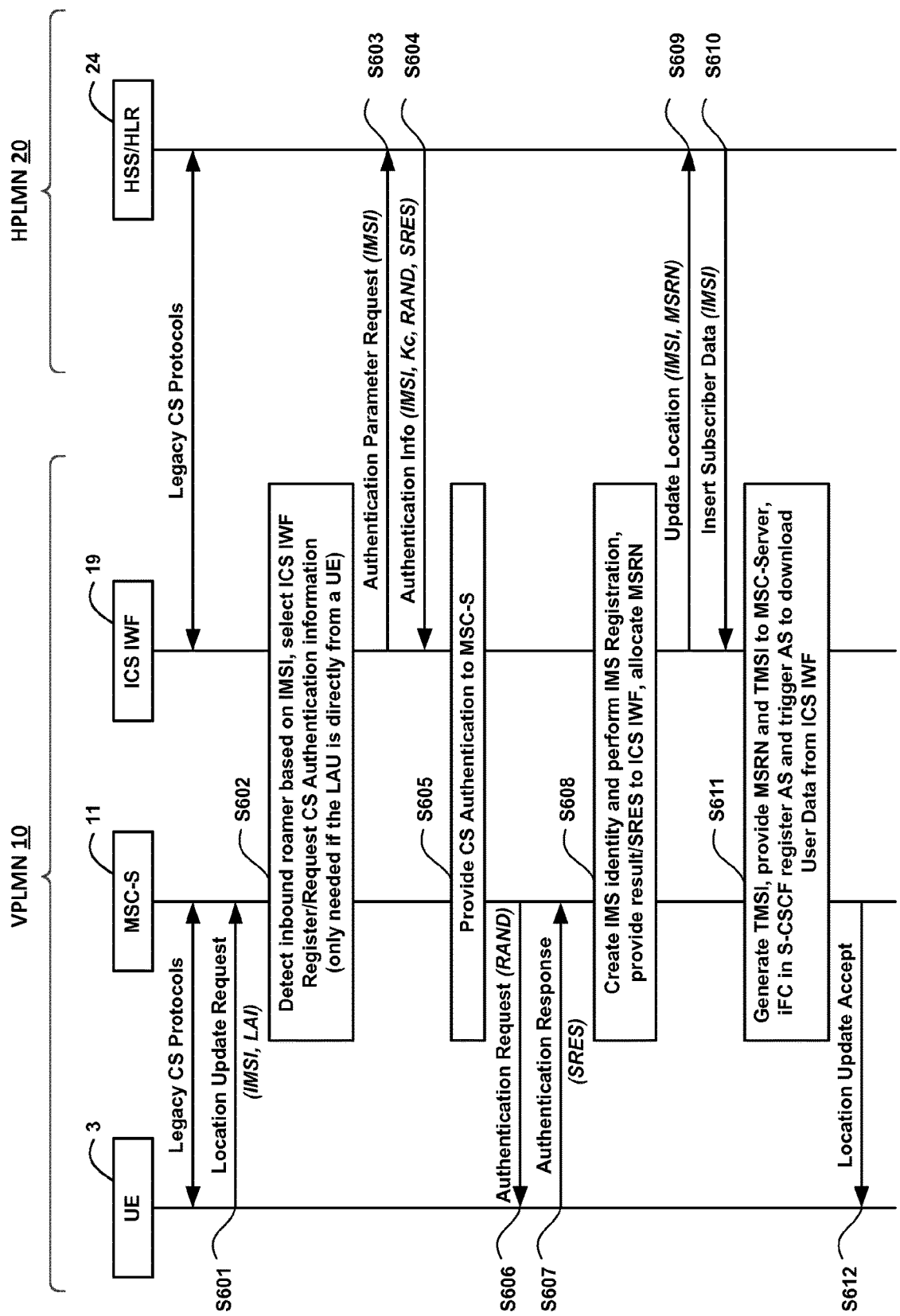
FIGS. 6 to 10 are exemplary timing diagrams illustrating methods performed by components of the mobile telecommunication system of FIG. 2 whilst carrying out embodiments of the invention.

FIG. 6 is an exemplary timing diagram illustrating a method performed by components of the mobile telecommunication system 1 of FIG. 1 when the mobile device 3 (from a non-ICS capable home network) is roaming into the visited network 10. Specifically, FIG. 6 shows the steps of an exemplary high-level procedure for granting an inbound roaming user access to the VPLMN ICS network in a protocol independent manner.

As explained above, the mobile device 3 belongs to the non-ICS/non-IMS home network 20 and it is currently roaming in the ICS (IMS) enabled visited network 10. Accordingly, as generally shown in FIG. 6, the mobile device 3 and the MSC-S 11, and the nodes of the ICS IWF 19 and the HSS/HLR 24 are configured to communicate with each other using appropriate legacy CS protocols. On the other hand, the nodes of the VPLMN 10 are configured to communicate with each other using the SIP and/or DIAMETER protocol.

In this example, the mobile device 3 initiates a registration procedure with the visited network 10 by generating and sending, in step S601, an appropriately formatted request (e.g. a 'Location Update Request') to the MSC-S 11. The mobile device 3 includes in this message its associated International Mobile Subscriber Identifier (IMSI) and a Location Area Identifier (LAI) associated with the area (cell) where the mobile device 3 is currently located.

Based on the IMSI, the MSC-S 11 determines (using its roaming support module 45) that the mobile device 3 is a roaming UE and that it belongs to the home network 20. Accordingly, the MSC-S 11 needs to contact the HSS/HLR 24 of the home network 20 for obtaining parameters (CS authentication data) for authenticating the mobile device 3. However, in this case the home network 20 is a non-ICS (IMS) network, thus the MSC-S 11 cannot contact the HSS/HLR 24 directly. Based on the inbound roaming detection, the MSC-S 11 is able to determine how to proceed with signaling for authentication, i.e. whether to contact the associated HSS (e.g. the HSS 14 for subscribers of the VPLMN 10 or a different HSS for subscribers of other ICS-enabled networks) or to contact the ICS IWF 19 (e.g. for subscribers of the non-ICS enabled HPLMN 20).

Since the mobile device 3 is determined to be a subscriber of the non-ICS enabled HPLMN 20, the MSC-S 11 generates (using its network interworking module 47) and sends, in step S602, an appropriately formatted signaling message to the ICS IWF 19, indicating that CS authentication is required for the mobile device 3.

Using its network interworking module 67, the ICS IWF 19 (acting as a VLR for the HLR of the home network 20) generates and sends, in step S603, an appropriately formatted signaling message to the HSS/HLR 24 of the mobile device's home network 20. The ICS IWF 19 includes in its message (e.g. an 'Authentication Parameter Request' and/or the like) the IMSI associated with the mobile device 3.

In response to the request from the ICS IWF 19, the HLR 24 retrieves from its database and provides the necessary CS authentication data to the ICS IWF 19 (as generally shown in step S604). It will be appreciated that steps S603 and S604 may comprise legacy VLR-HLR interactions although in this case VLR functionality is provided by the ICS IWF 19. In this example, the HSS 24 returns the requested CS authentication data to the ICS IWF 19, including: the IMSI associated with the mobile device 3; an authentication key (e.g. Kc) associated with the mobile device 3; and a random number (RAND) with a corresponding response (SRES).

Next, as generally illustrated in step S605, the ICS IWF 19 provides the received CS authentication data to the MSC-S 11 (although it will be appreciated that the ICS IWF may be configured not to send the SRES to the MSC-S 11). The MSC-S 11 stores the CS authentication parameters and proceeds to carry out a CS authentication procedure with the mobile device 3.

Specifically, the MSC-S 11 generates (using its authentication module 43) and sends, to the mobile device 3 in step S606, an appropriately formatted authentication request including the received RAND value. The mobile device 3 computes an SRES from the received RAND and returns the RAND to the MSC-S 11, in step S607, in an appropriately formatted authentication response.

As generally illustrated in step S608, the MSC-S 11 provides the SRES value to the ISC IWF 19 and creates an appropriate IMS identity and performs IMS registration for the mobile device 3 (if not already done). Optionally, the MSC-S 11 (or another VPLMN node, e.g. the CSCF 18) may be configured to compare the SRES from the mobile device 3 with the one received from the ICS IWF 19 (if the SRES was sent by the ICS IWF 19 in step S605). In this case the MSC-S 11 is configured to indicate the ICS IWF 19 the result of the comparison, i.e. whether the ICS IWF 19 should proceed to the next step. If the CS authentication procedure was successful (e.g. the MSC-S 11 or the ICS IWF 19 determined that the mobile device 3 returned the correct SRES value for the RAND that was sent), the ICS IWF 19 (acting as a VLR) allocates an MSRN for the mobile device 3.

The ICS IWF 19 (acting as VLR) then proceeds to step S609, in which it generates and sends an appropriately formatted message to the HLR 24 of the home network 20 informing the home network 20 about the mobile device's 3 current location. As shown in FIG. 6, this message (e.g. an 'Update Location Request') includes the mobile device's 3 IMSI and MSRN.

In response to the location update request, the HSS 24 provides the subscription profile and service settings for the mobile device 3 to the ICS IWF 19, in accordance with normal VLR-HLR procedures.

As generally shown in step S611, the ICS IWF 19 acts as an HSS towards the MSC-S 11 (and/or the S-CSCF 18) and converts the CS subscription profile into an appropriate IMS subscription profile that can be downloaded to MSC-S 11 (and/or the S-CSCF 18). The ICS IWF 19 may also be configured to convert the CS Service Settings and act like a Telephony Application Server (TAS) or provide the settings to a TAS of the VPLMN 10. The ICS IWF 19 also generates an appropriate temporary identifier for the mobile device 3, for example, a Temporary Mobile Subscriber Identity (TMSI), and provides it to the MSC-S 11 and the mobile device 3.

Thus, beneficially, the visited network 10 is able to obtain the necessary subscriber data from the home network 20 even without a VLR in place and without requiring ICS/IMS in the home network 20. Beneficially, the MSC-S 11 is able to perform ciphering of its communication with the mobile device 3 according to normal (CS) procedures.

The MSC-S 11 also generates and sends, in step S612, an appropriately formatted 'Location Update Accept' message to the mobile device 3 according to the normal procedures. Effectively, this message is a response to the message received at step S601 and informs the mobile device 3 that the location update request has been accepted.

The following is a detailed description of some possible ways (and modifications to) the generic procedure described with reference to FIG. 6 may be implemented in the system shown in FIG. 2.

Figure 7:
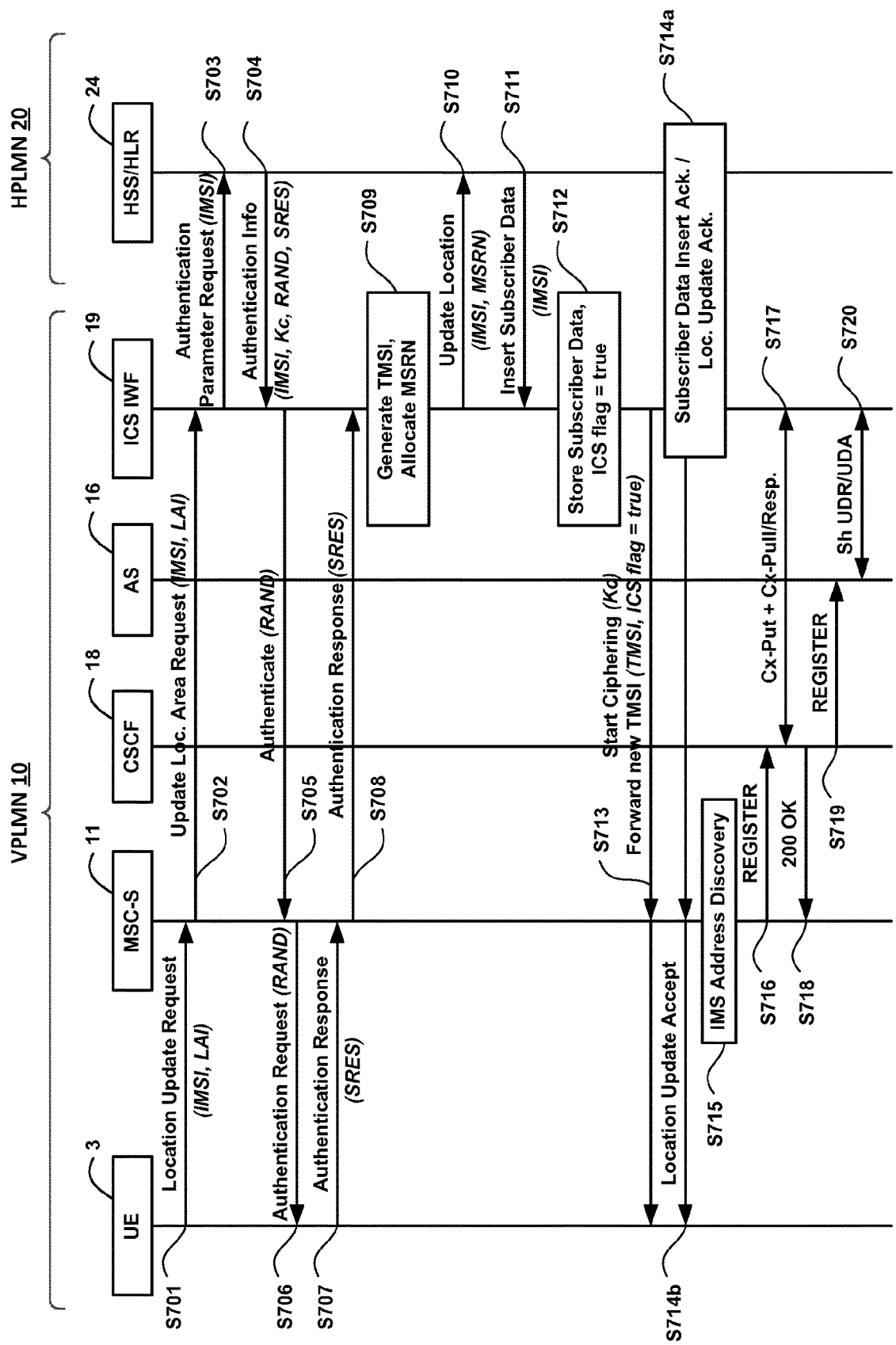

ICS IWF acting as a VLR towards the MSC-S and the HLR in the HPLMN FIG. 7 is an exemplary timing diagram illustrating a method performed by components of the mobile telecommunication system 1 of FIG. 2 when the mobile device 3 is roaming from a non-ICS capable home network 20 to an ICS capable visited network 10. In this alternative, the ICS IWF 19 acts as a VLR in its communications with both the MSC-S 11 and the HLR 24 (of the HPLMN 20). Moreover, the ICS IWF 19 acts as a HSS towards the CSCF(s) 18. It will be appreciated that this approach beneficially allows keeping a MAP based reference point between MSC-S 11 and the ICS IWF 19.

The description of those steps of FIG. 7 that correspond to the steps described above with reference to FIG. 6 is omitted herein for simplicity.

The process beings in step S701 (e.g. a Location Update Request and/or the like) in which the mobile device 3 provides its IMSI and LAI to the MSC-S 11. In step S702 (which generally corresponds to step S602), the MSC-S 11 detects (based on the IMSI) that the mobile device 3 does not belong to the visited network 10, i.e. it is an inbound roaming subscriber. Therefore, the MSC-S 11 contacts the ICS IWF 19 by sending a Update Location Area Request message including the received LAI and IMSI. Steps S703 to S707 generally correspond to steps S603 to S607 respectively.

In step S708, the MSC-S 11 generates and sends an appropriately formatted signaling message (e.g. an 'Authentication Response' message) in order to provide the SRES value to the ISC IWF 19. If the CS authentication procedure was successful, then in step S709 the ICS IWF 19 allocates an MSRN for the mobile device 3 and generates an appropriate temporary identifier for the mobile device 3 (e.g. TMSI). The ICS IWF 19 (acting as a VLR) then proceeds to step S710, in which it generates and sends an appropriately formatted message (e.g. an 'Update Location Request' including the IMSI and MSRN) to the HLR 24 informing the home network 20 about the mobile device's 3 current location. Steps S710 and S711 generally correspond to steps S609 and S610 respectively.

In step S712, the ICS IWF 19 stores the received CS subscription profile (subscriber data). Effectively, in step S712, the ICS IWF 19 acts as a VLR/HSS towards the CSCF 18 (S-CSCF) and/or the MSC-S 11 and converts the received CS subscription profile into an appropriate IMS subscription profile that can be downloaded to the S-CSCF 18 at IMS registration for the mobile device 3. The ICS IWF 19 may also be configured to convert the CS Service Settings and act like an AS for the mobile device 3 (and/or provide the settings to the AS 16). In order to invoke other AS(s) 16, the ICS IWF 16 is configured to generate the corresponding Initial Filter Criteria(s) (iFC(s)).

In step S713, the ICS IWF 19 generates and sends the Start Ciphering Command with the Kc to the MSC-S 11 (which forwards it to the mobile device 3) and provides the TMSI to the mobile device 3 (via the MSC-S 11). It will be appreciated that appropriate acknowledgements may be sent from the mobile device 3 and the MSC-S 11 to the ICS IWF 19 which are omitted from FIG. 7 for simplicity.

As generally shown in steps S714a-S714b, the ISC IWF 19 generates and sends a Subscriber Data Insert Acknowledgement message to the HLR/HSS 24 and receives a Location Update Accept message from the HSS/HLR 24. The ICS IWF 19 then sends (forwards) the Location Update Accept message to the MSC-S 11 (which forwards it to the mobile device 3).

In step S715, the MSC-S 11 performs an appropriate IMS address discovery procedure (using e.g. the SIP protocol) for registering the mobile device 3 with the visited network 10. As part of this step the MSC-S 11 constructs an appropriate IMS identity for the mobile device 3 (which belongs to the non-IMS home network 20) based on available information, such as a 'tel-URI' from a Mobile Station International Subscriber Directory Number (MSISDN) associated with the mobile device 3 and/or the like.

In step S716, the MSC-S 11 (using its SIP/DIAMETER module 44) initiates IMS registration (by generating and sending an appropriately formatted SIP REGISTER message) to the I/S-CSCF 18. It will be appreciated that, although not shown, the SIP message may include the IMS identity for the mobile device 3 and/or other information identifying the mobile device 3 (e.g. IMSI).

In response to receiving the SIP REGISTER message, the I/S-CSCF 18 performs appropriate DIAMETER operations with the ICS IWF 19 (e.g. Cx-Put and Cx-Pull requests and associated responses)—as generally shown in step S717. The ICS IWF 19 in this case acts as an HSS towards the I/S-CSCF 18. The S-CSCF 18 downloads the subscriber profile from the ICS IWF 19 including the applicable iFC(s) (generated in step S712).

In step S718, the S-CSCF 18 generates and sends an appropriate SIP response ('200 OK') back to the MSC-S 11 indicating that the registration can proceed. Accordingly, in step S719, the S-CSCF 19 performs appropriate 3rd party registrations (according to the iFC) in order to notify the AS 16 that the MSC-S 11 has registered the mobile device 3.

In step S720, the AS 16 subscribes to notifications relating to the mobile device 3 and downloads, from the ICS IWF 19 acting as an HSS, data needed for providing a service to the mobile device 3. In this example, the AS 16 sends an appropriately formatted User Data Request (UDR) command to the ICS IWF 19, including 'Sh-Subs-Notif' parameters (user identity, requested data, service information and send data indication). The ICS IWF 19 confirms the subscription request and sends data to AS 16 using an appropriately formatted User Data Answer (UDA).

Beneficially, this completes the registration of the mobile device 3 with the visited network 10 and the mobile device 3 is now able to use IMS/ICS services even though its home network 20 does not support IMS/ICS, it does not provide IMS subscription, and/or it does not have an appropriate service level agreement with the VPLMN 10 on IMS services.

Figure 8:
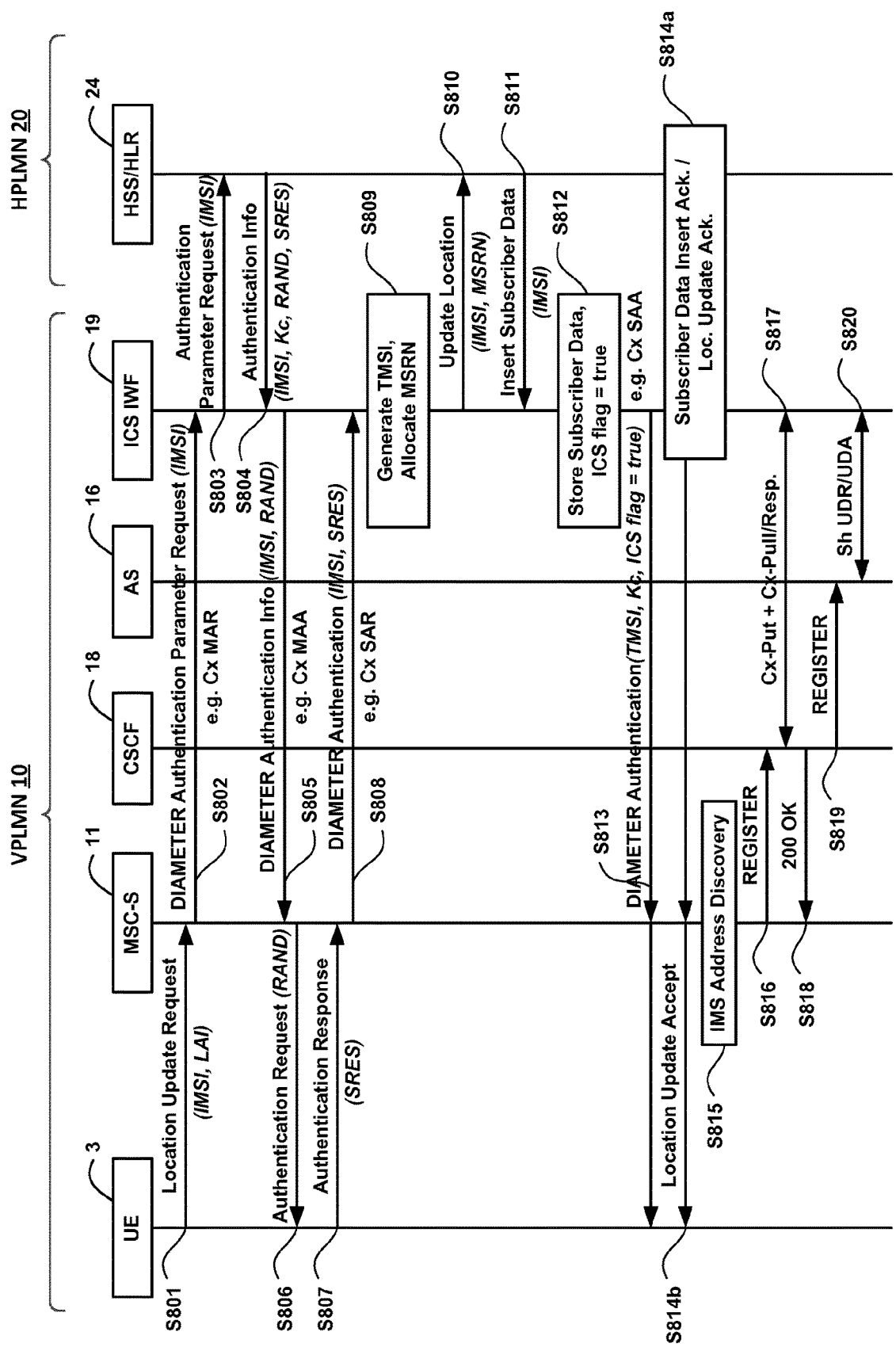

ICS IWF acting as an HSS towards the MSC-S with DIAMETER based reference point and acting as a VLR towards the HLR in the HPLMN FIG. 8 is another exemplary timing diagram illustrating a method performed by components of the mobile telecommunication system 1 of FIG. 2 when the mobile device 3 is roaming from a non-ICS capable home network 20 to an ICS capable visited network 10. Similarly to FIG. 7, the ICS IWF 19 acts as a VLR in its communications with both the MSC-S 11 and the HLR 24 (of the HPLMN 20). Moreover, the ICS IWF 19 acts as a HSS towards the CSCF(s) 18, and the MSC-S 11 is configured to act as an S-CSCF 18 for receiving CS authentication information from the ICS IWF 19. Thus, in this example, the protocol used between the MSC-S 11 and the ICS IWF 19 is the DIAMETER protocol (albeit adapted for this purpose).

Whilst in this example communications the MSC-S 11 and the ICS IWF 19 are based on the Multimedia-Auth-Request/Answer (MAR/MAA) and Server-Assignment-Request/Answer (SAR/SAA) Diameter commands (forming part of the Cx reference point described in 3GPP TS 29.229 V12.7.0), the proposed commands introduce some enhancements/new functionalities. Effectively, in this example the MSC-S 11 is configured to act as a Diameter Multimedia client and the ICS IWF 19 is configured to act as a Diameter Multimedia server. For the sake of simplification, the details of Diameter session establishment and termination are omitted herein.

The process beings in step S801 (e.g. a Location Update Request and/or the like) in which the mobile device 3 provides its IMSI and LAI to the MSC-S 11. The MSC-S 11 detects (based on the IMSI) that the mobile device 3 does not belong to the visited network 10, i.e. it is an inbound roaming subscriber. Accordingly, in step S802, the MSC-S 11 contacts the ICS IWF 19, by generating (using its SIP/DIAMETER module 44) and sending a DIAMETER Authentication Request, including the IMSI from the mobile device 3. Whilst the message sent in step S802 is based on the so-called Multimedia-Auth-Request (MAR) command (described in clause 6.1.7 of 3GPP TS 29.229) but it also includes the UE's IMSI. Although this command is typically used by an S-CSCF, in this example it is used by the MSC-S 11 to contact the ICS IWF 19, which is acting as an HSS towards the MSC-S 11.

Steps S803 and S804 generally correspond to steps S603 and S604 respectively.

In response to receiving the CS authentication information from the HSS/HLR 24 of the home network 20, the ICS IWF 19 generates and sends, in step S805, an appropriately formatted DIAMETER command (denoted 'DIAMETER Authentication Info' in FIG. 8) to the MSC-S 11, including the RAND parameter (along with the IMSI of the mobile device 3). For example, the message in step S805 may be based on the Multimedia-Auth-Answer (MAA) command (described in clause 6.1.8 of 3GPP TS 29.229) but it also includes the RAND value for authenticating the mobile device 3. Thus, beneficially, the MAA command is sent to the MSC-S 11 instead of an S-CSCF (to which the MAA command would normally be sent in other systems).

Steps S806 and S807 generally correspond to steps S606 and S607 respectively.

In step S808, the MSC-S 11 provides the SRES value to the ISC IWF 19 by generating and sending an appropriately formatted DIAMETER Authentication Request (also including the IMSI to indicate which UE the SRES relates to). This step is based on the Server-Assignment-Request (SAR) command (described in clause 6.1.3 of 3GPP TS 29.229) but in this example it also includes the UE's IMSI and SRES. Whilst the SAR command is typically used by an S-CSCF, however, in this example the MSC-S 11 uses this command to communicate with the ISC IWF 19 (which is acting as an HSS).

Steps S809 to S812 generally correspond to steps S709 to S712, respectively, which were described above.

However, in step S813, instead of sending a Start Ciphering Command to the MSC-S 11, in this example the ICS IWF 19 sends an appropriate DIAMETER answer to the request received in step S808. Specifically, the ICS IWF 19 generates and sends an appropriately formatted Server-Assignment-Answer (SAA) command (and/or the like) to the MSC-S 11 and includes in this command the Kc, the temporary identifier (TMSI) associated with the mobile device 3, and an indication (e.g. an ICS-flag) that ICS is enabled for the mobile device 3. Thus, whilst this step is generally based on SAA command (described in clause 6.1.4 of 3GPP TS 29.229), it also includes the Kc, TMSI, and an ICS-flag, and this command is sent to the MSC-S instead of an S-CSCF. The MSC-S 11 provides the TMSI to the mobile device 3 and starts the ciphering with Kc (not shown in FIG. 8) before proceeding to the next steps.

Steps S814a to S820 correspond to steps S714a to S720, respectively. Their description is omitted herein for brevity.

Beneficially, this completes the registration of the mobile device 3 with the visited network 10 and the mobile device 3 is now able to use IMS/ICS services even though its home network 20 does not support IMS/ICS, it does not provide IMS subscription, and/or it does not have an appropriate service level agreement with the VPLMN 10 on IMS services.

ICS IWF acting as an HSS towards the S-CSCF with DIAMETER based reference point and acting as a VLR towards the HLR in the HPLMN.

Figure 9:
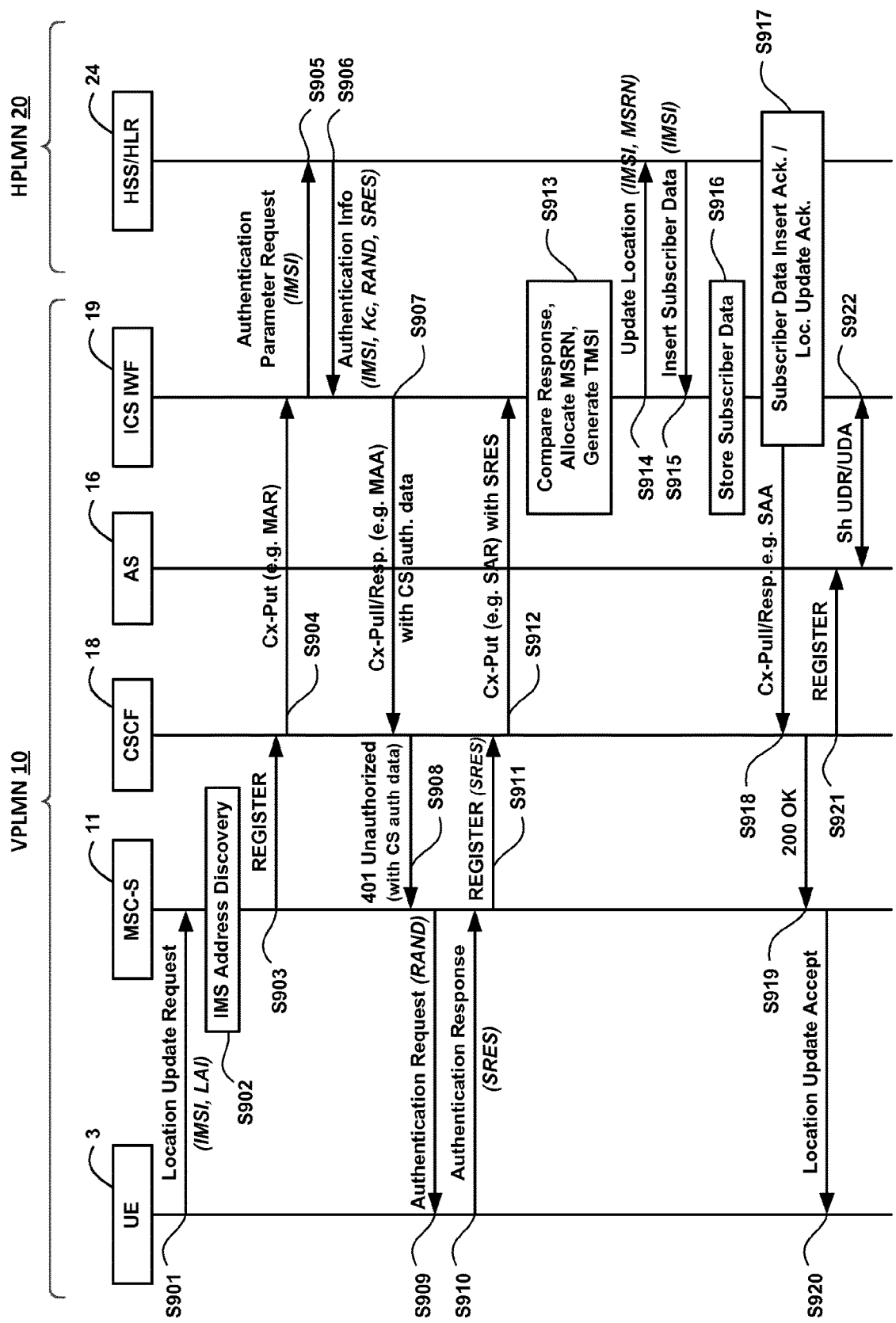

FIG. 9 is yet another exemplary timing diagram illustrating a method performed by components of the mobile telecommunication system 1 of FIG. 2 when the mobile device 3 is roaming from a non-ICS capable home network 20 to an ICS capable visited network 10. In this alternative, the ICS IWF 19 acts as an HSS in its communications with the CSCF 18 (S-CSCF) and acts as a VLR towards the HLR 24 (of the HPLMN 20). This example is a modification of the example shown in FIG. 8. However, in this case the MSC-S 11 and the CSCF 18 communicate using the SIP protocol whilst the DIAMETER protocol is used between the CSCF 18 and the ICS IWF 19.

Whilst in this example communications between the CSCF 18 and the ISC IWF 19 are based on the Multimedia-Auth-Request/Answer (MAR/MAA) and Server-Assignment-Request/Answer (SAR/SAA) Diameter commands (forming part of the Cx reference point described in 3GPP TS 29.229 V12.7.0), the proposed commands introduce some enhancements/new functionalities. Effectively, in this example the MSC-S 11 is configured to act as a Diameter Multimedia client and the ICS IWF 19 is configured to act as a Diameter Multimedia server. However, CS authentication data is carried within appropriate SIP signaling (between the CSCF 18 and the MSC-S 11). For the sake of simplification, the details of Diameter session establishment and termination are omitted herein.

The process beings in step S901 (e.g. a Location Update Request and/or the like) in which the mobile device 3 provides its IMSI and LAI to the MSC-S 11. The MSC-S 11 detects (based on the IMSI) that the mobile device 3 does not belong to the visited network 10, i.e. it is an inbound roaming subscriber.

In step S902 (which corresponds to step S715), the MSC-S 11 performs an appropriate IMS address discovery procedure (using e.g. the SIP protocol) for registering the mobile device 3 with the visited network 10. As part of this step the MSC-S 11 constructs an appropriate IMS identity for the mobile device 3 (which belongs to the non-IMS home network 20) based on available information, such as a 'tel-URI' from a Mobile Station International Subscriber Directory Number (MSISDN) associated with the mobile device 3 and/or the like.

In step S903, the MSC-S 11 (using its SIP/DIAMETER module 44) initiates IMS registration (by generating and sending an appropriately formatted SIP REGISTER message) to the I/S-CSCF 18 including the received LAI and IMSI. It will be appreciated that, although not shown, the SIP message may include the IMS identity for the mobile device 3.

In response to receiving the SIP REGISTER message, the I/S-CSCF 18 generates and sends, in step S904, an appropriately formatted Cx (DIAMETER) command to the ICS IWF 19 (e.g. Cx-Put). The message in step S904 may be based on the Multimedia-Auth-Request (MAR) command (described in clause 6.1.7 of 3GPP TS 29.229) and/or any other suitable Cx command but also includes the UE's IMSI. The ICS IWF acts as an HSS towards the I/S-CSCF 18.

Steps S905 and S906 generally correspond to steps S603 and S604 respectively.

In step S907, the ICS IWF 19 (acting as an HSS) generates and sends an appropriately formatted Cx-pull/ response to the S-CSCF 18 including the RAND value for CS authentication of the mobile device 3. This step is based on the Multimedia-Auth-Answer (MAA) command (described in clause 6.1.8 of 3GPP TS 29.229), but also includes the required CS authentication information.

In step S908, the S-CSCF generates and sends an appropriate SIP response ('401 Unauthorized') to the MSC-S 11 including the RAND for CS authentication of the mobile device 3. Steps S909 and S910 generally correspond to steps S606 and S607 respectively.

In step S911, after receiving the SRES from the mobile device 3, the MSC-S 11 generates and sends another SIP REGISTER message to the I/S-CSCF 18 including the SRES.

In response to receiving the SIP REGISTER message with the SRES, the I/S-CSCF 18 generates and sends, in step S912, an appropriately formatted Cx command (e.g. Cx-Put) to the ICS IWF 19 (acting as an HSS). The message in step S912 may be based on the Server-Assignment-Request (SAR) command (described in clause 6.1.3 of 3GPP TS 29.229) and/or other suitable Cx command but also includes the SRES from the mobile device 3.

In step S913, the ISC IWF 19 compares the SRES and (if the CS authentication procedure was successful) it generates an appropriate temporary identifier for the mobile device 3 (e.g. TMSI). The ISC IWF 19 also allocates a MSRN for the mobile device 3. Next, the ICS IWF 19 (acting as a VLR) proceeds to step S914, in which it generates and sends an appropriately formatted message (e.g. an 'Update Location Request' including the IMSI and MSRN) to the HLR 24. Steps S914 and S915 generally correspond to steps S609 and S610 respectively.

In step S916, the ICS IWF 19 (acting as an HSS towards the S-CSCF 18) stores and converts the received CS subscription profile and generates iFC(s) as described above with reference to step S712.

In step S917, the ISC IWF 19 generates and sends a Subscriber Data Insert Acknowledgement message to the HLR/HSS 24 and receives a Location Update Accept message from the HSS/HLR 24. In response to the Location Update Accept message, the ICS IWF 19 generates and sends, in step S918, an appropriately formatted DIAMETER answer (e.g. Cx-pull/response) to the S-CSCF 18. This step is beneficially based on the Server-Assignment-Answer (SAA) command (described in clause 6.1.4 of 3GPP TS 29.229), but also includes the Kc (if not yet sent in S907), the temporary identifier (TMSI) associated with the mobile device 3, and an indication (e.g. an ICS-flag) that ICS is enabled for the mobile device 3. The ICS IWF 19 may also include a Location Update Accept flag.

In step S919, the S-CSCF 18 generates and sends an appropriate SIP response ('200 OK') back to the MSC-S 11 indicating that the registration can proceed. In this example, the SIP response also includes the Kc, TMSI, and Location Update Accept flag. The MSC-S 11 provides the TMSI to the mobile device and starts the ciphering with Kc (not shown in FIG. 9). In step S920, the MSC-S 11 sends an appropriate Location Update Accept message to the mobile device 3 (relating to the request received in step S901).

In step S921, the S-CSCF 19 performs appropriate 3rd party registrations (according to the iFC) in order to notify the AS 16 that the MSC-S 11 has registered the mobile device 3.

In step S922 (which corresponds to step S720), the AS 16 subscribes to notifications relating to the mobile device 3 and downloads, from the ICS IWF 19 acting as an HSS, data needed for providing a service to the mobile device 3. The ICS IWF 19 confirms the subscription request and sends data to AS 16 using an appropriately formatted User Data Answer (UDA).

This completes the registration of the mobile device 3 with the visited network 10 and the mobile device 3 is now able to use IMS/ICS services even though its home network 20 does not support IMS/ICS, it does not provide IMS subscription, and/or it does not have an appropriate service level agreement with the VPLMN 10 on IMS services.

Figure 10:
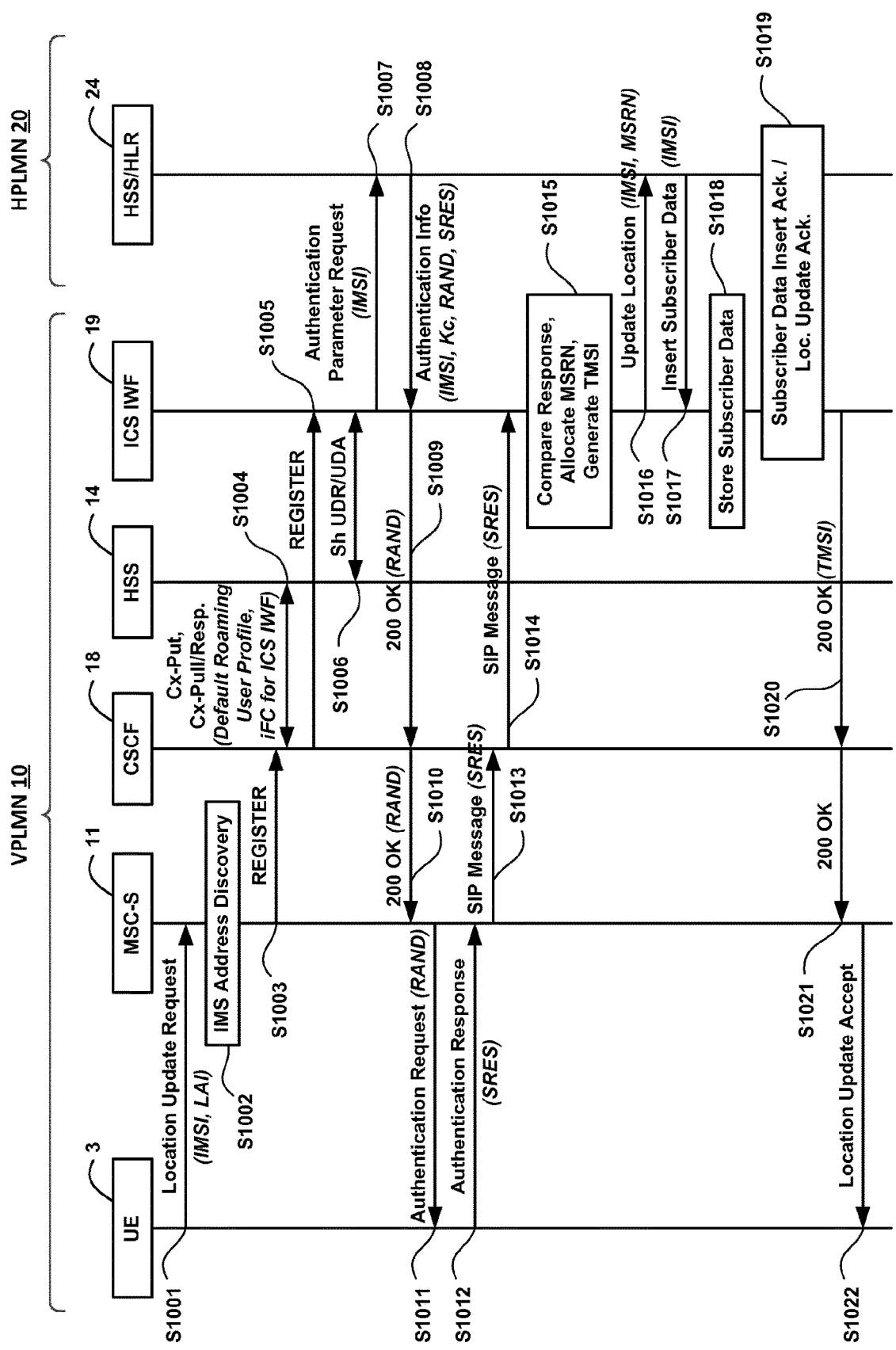

ICS IWF acting as an AS towards the HSS and the S-CSCF and acting as a VLR towards the HLR in the HPLMN FIG. 10 is an exemplary timing diagram illustrating a method performed by components of the mobile telecommunication system 1 of FIG. 2 when the mobile device 3 is roaming from a non-ICS capable home network 20 to an ICS capable visited network 10. FIG. 10 is a modification of FIG. 9. However, in this example, the ICS IWF 19 acts as an AS in its communications with both the HSS 14 and the CSCF 18 (S-CSCF) and CS authentication data is carried within SIP signaling.

Steps S1001 to S1003 correspond to steps S901 to S903, respectively. However, in this example, upon receipt of the SIP REGISTER request, the I/S-CSCF 18 is configured to perform appropriate Cx operations (e.g. MAR/MAA, SAR/SAA) with the HSS 14.

Specifically, as shown in step S1004, the I/S-CSCF 18 and the HSS 14 perform Cx operations (Cx-Put, Cx-Pull/Resp) in order to obtain an appropriate (default) user profile to the roaming mobile device 3. The HSS 14 stores the default inbound roamer profile with an appropriate iFC pointing to the ICS IWF 19, which is acting as an AS for the S-CSCF 18.

Therefore, in step S1005, the S-CSCF 18 performs service control and 3rd party registrations according to the iFC in order to notify the associated AS (i.e. the ISC IWF 19 acting as an AS for the roaming mobile device 3) that the MSC-S 11 has registered the mobile device 3.

In step S1006, the ISC IWF 19 acting as an AS subscribes to notifications relating to the mobile device 3 and downloads, from the HSS 14, data needed for providing a service to the mobile device 3. In this example, the ISC IWF 19 generates and sends an appropriately formatted UDR command to the HSS 14, including 'Sh-Subs-Notif' parameters (user identity, requested data, service information and send data indication). The HSS 14 confirms the subscription request and sends data to the ISC IWF 19 (acting as an AS for the roaming mobile device 3) using an appropriately formatted UDA command.

In steps S1007 and S1008 (as described above with reference to steps S603 and S604), the ICS IWF 19 (acting as a VLR) obtains the necessary CS authentication data for authenticating the mobile device 3. The CS authentication data includes: the IMSI associated with the mobile device 3; an authentication key (e.g. Kc) associated with the mobile device 3; and a random number (RAND) with a corresponding response (SRES).

In step S1009, the ICS IWF 19 (acting as an AS for the mobile device 3) generates and sends an appropriate SIP response (200 OK) to the S-CSCF 18 including the RAND value for CS authentication. In step S1010, the S-CSCF 18 forwards the 200 OK response (with the RAND) to the MSC-S 11, which authenticates the mobile device in steps S1011 and S1012, as described above with reference to FIG. 6 (steps S606 and S607).

In step S1013, after receiving the SRES from the mobile device 3, the MSC-S 11 generates and sends another SIP message to the I/S-CSCF 18 including the SRES. The SIP message may comprise any suitable SIP message, such as a NOTIFY, OPTIONS, UPDATE, INVITE, REGISTER message, and/or the like. It will be appreciated that appropriate SIP routing may be employed to forward the SIP message towards the ICS IWF 19 (acting as an AS), as generally shown in step S1014.

Steps S1015 to S1019 correspond to steps S913 to S917, respectively. Their description is omitted herein for brevity. However, in this example, since the ICS IWF 19 is acting as an AS, it generates and sends, in step S1020, an appropriately formatted SIP response (e.g. 200 OK) to the S-CSCF 18, and includes the TMSI in this message (for sending to the mobile device 3). starts the ciphering with Kc, which is not shown in this flow. The MSC Server sends the Location Update Accept message to the UE.

Next, in step s1021, the S-CSCF 18 forwards the SIP 200 OK response to the MSC-S 11 indicating that the registration can proceed. The MSC-S 11 provides the TMSI to the mobile device 3 and starts the ciphering with Kc (not shown in FIG. 10). In step S1022, the MSC-S 11 sends an appropriate Location Update Accept message to the mobile device 3 (relating to the request received in step S1001).

It can be seen that the above embodiments make it possible to register and authenticate the mobile device 3 with the visited network 10 and to provide IMS/ICS services to the mobile device 3 even if its home network 20 does not support IMS/ICS, it does not provide IMS subscription, and/or it does not have an appropriate service level agreement with the VPLMN 10 on IMS services.

The above examples also provide one or more of the following benefits:

Removal of VLR and CS interactions from the VPLMN and provide appropriate interworking with the HPLMN HLR for inbound roamers at the edge of the network through an ICS IWF in the VPLMN. Depending on the operator's network configuration and preferences, the ICS IWF may be co-located with the HSS, IBCF, AS, etc.

It is possible to keep legacy CS signaling between UEs and MSC as well as ICS IWF and HLR/HSS in HPLMN.

The ICS IWF may be configured to act as an HSS or an AS towards the VPLMN nodes and as a VLR towards the HPLMN HLR.

Legacy VLR-HLR communication between ICS IWF and HLR may be triggered by either MAP, DIAMETER, or SIP messages from the MSC-S (or S-CSCF).

CS authentication parameters may be sent to the MSC-S via MAP, DIAMETER, or SIP signaling.

ICS IWF is configured to act as a VLR and allocates TMSI, compares SRES, allocates MSRN, converts the CS subscription profile into an IMS subscription profile. The ICS IWF may also convert the CS Service Settings and act as a TAS or provide the CS Service Settings to a TAS.

It will be appreciated that the above benefits may be achieved by performing one or more of the following steps:

Detecting an inbound roamer (based on IMSI) in the MSC-S, selecting ICS IWF, registering/requesting CS Authentication information from ICS IWF (if the LAU is directly from a UE);

Performing legacy VLR-HLR Authentication Parameter Request/Response procedure between VPLMN ICS IWF and HPLMN HLR;

Providing CS authentication parameter(s) from the ICS IWF to the MSC-S;

Performing legacy Authentication Request/Response between MSC-S and UE;

Creating an appropriate IMS identity and performing IMS Registration, providing authentication result/SRES to ICS IWF (or S-CSCF);

Allocating TMSI and MSRN, comparing SRES, performing legacy VLR-HLR Update Location Request/Response and Insert Subscriber Data between VPLMN ICS IWF and HPLMN HLR;

Providing iFC(s) to S-CSCF for registering the UE with an appropriate AS, triggering AS to download User Data from ICS IWF (if ICS IWF is not collocated with the AS); and Completing legacy Location Update for the UE, providing Kc and ciphering.

It will be appreciated that the sequence of the steps performed depends on the protocol used and colocation of the ICS IWF with any other functional entities such as the AS, HSS, IBCF, MSC-S, S-CSCF, VLR, etc.

Compared to the current state of the art, the above exemplary embodiments make it possible for operators to remove VLR functionality from the MSC-S whilst still allowing inbound roamers without ICS network or IMS subscription to use their IMS network (VPLMN 10 in FIG. 2). It will also be appreciated that the above embodiments are particularly suited to an inbound roamer belonging to a network operator (HPLMN 20 in FIG. 2) that does not have a service level agreement for ICS or IMS roaming with the visited network.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the first step of FIGS. 6 to 10, the mobile device is described to send a Location Update Request message to the MSC-S including its IMSI and LAI. However, it will be appreciated that in case of a combined attach (or Circuit Switched FallBack (CSFB) and/or the like), the Location Update Request may be send from an MME or SGSN. If the Location Update Request is coming from an MME/SGSN, then the steps of the CS authentication may be skipped (e.g. steps S603 to S607 of FIG. 6, and the corresponding steps of FIGS. 7 to 10).

In step S911, the MSC-S is described to forward the response (SRES) from the mobile device to the CSCF in a SIP REGISTER message. It will be appreciated that the CSCF (e.g. when configured as an S-CSCF) may compare the SRES to the SRES received from the HSS/HLR of the home network (in step S907). In this case, therefore, there is no need for the ISC IWF to carry out the comparison, in step S913, because the CSCF can carry out authentication of the mobile device based on the SRES. It is also not necessary to include the SRES in the Cx command (e.g. SAR command in step S912) and hence a conventional Cx command may be used instead of the SAR command described above.

It will be appreciated that the mobile device may also perform a Location Update procedure when moving out of its current Location Area (LA). The new LA may belong to a different MSC-S, but since the mobile device is already attached to the network, it sends, to the new MSC-S, a Location Area Update message including only its associated TMSI (instead of its IMSI). Similarly to the above described examples, the new MSC-S may also be configured to contact the ICS IWF in order to register the mobile device with the IMS. However, in this case the ICS IWF may not need to contact the HLR/HSS of the HPLMN again because it can already provide the necessary CS authentication data to the new MSC. The Location Area Update message may be handled locally without requiring any interaction with the HLR/HSS in the HPLMN.

It will be appreciated that the radio access technology is not limited to E-UTRA, and may comprise any suitable access technology in accordance with one or more of the following standards: LTE, UMTS, GPRS, WiFi, WiMAX, and/or the like.

It will be appreciated that the above description may be applicable to 3GPP mobile networks, using GSM, GPRS, UMTS, HSPA, LTE, LTE-A access, and/or the like. However, the above description is not limited to such networks and could be used in the same way for any other cellular or mobile network, e.g. CDM2000, Bluetooth, 802.11 variants, ZigBee etc., i.e. any access technologies and core network technologies, to which a CS capable mobile device (UE) can connect.

The above described protocol options are considered to be DIAMETER, MAP, SIP, although it will be appreciated that any other suitable protocol may be used (such as HTTP, XCAP, RADIUS etc). The above description discusses ICS and MSC-S, although it may also be applicable to any kind of SoftSwitch with Media Gateway (not only MSC-S). The functional element ICS Interworking Function may be provided as a separate entity or it may be collocated with another entity (e.g. the MSC-Server, HSS, Interconnect Border Control Function (IBCF), CSCF, AS, Packet Data Network Gateway (PGW), etc).

The CS authentication data in the above examples is described to include the parameters SRES, Kc and RAND. However, it will be appreciated that other parameters may also be used (e.g. in addition to, or instead of, the parameters SRES, Kc and RAND).

It will be appreciated that the reference points that the ICS IWF uses to connect with other nodes may be based on the Rx, Cx, Sh, B (MSC-VLR), Mw, i2, ISC reference point, and/or the like. The ICS IWF may be implemented as an enhanced VLR, supporting a similar functionality but different protocols towards the MSC-S and/or other IMS core network nodes, e.g. DIAMETER, HTTP, and SIP etc.

In the above embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop/tablet computers, booklet computers, wireless routers, web browsers, e-book readers, etc. As those skilled in the art will appreciate, it is not essential that the above described system be used for mobile communications devices. The system can be used to improve a network having one or more fixed communication devices as well as or instead of the mobile communicating devices.

In the above description of FIGS. 4 and 5, the MSC-S and the ICS IWF are described to include a number of components and modules, such as a transceiver circuit, network interface, controller, memory, etc. It will be appreciated that other network entities may also be implemented using the same or similar components and modules, adapted to function as a different entity. For example, the CSCF may comprise a transceiver, a network interface, a controller, and a memory (which may include the above described authentication module and/or network interworking module).

In the above embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above embodiments employed transceiver circuitry, at least some of the functionality of the transceiver circuitry can be performed by software.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The controller may be configured to control the transceiver to receive the request for authentication information from a serving Call Session Control Function (CSCF). It will be appreciated that the request for authentication information may be initiated by a Mobile Switching Centre (MSC) server (e.g. upon the MSC server receiving a location update request from the UE).

The transceiver may be configured to receive the request for authentication information in a Diameter protocol (e.g. Cx) message or in a Session Initiation Protocol (SIP) message. The transceiver may also be configured to transmit the authentication information in a Diameter protocol (e.g. Cx) message or in a SIP message.

The controller may be further configured to control the communication apparatus to act as a Home Subscriber Server (HSS) and/or an application server (AS) towards the communication entity of the VPLMN and to act as a visited location register (VLR) towards the communication entity of the HPLMN.

The processor may be configured to generate and store a subscription profile, for the inbound roamer, following receipt of the authentication information. The processor may also be configured to generate at least one initial filter criteria (iFC) for invoking at least one application server (AS). The UE may be attached to the VPLMN using a circuit switched (CS) communication technology and the authentication information may comprise CS authentication information.

The communication apparatus according to the first aspect of the invention may comprise an IP Multimedia Subsystem centralised services interworking function (ICS IWF). The communication apparatus according to the second aspect may comprise a serving Call Session Control Function (CSCF) or an MSC server.

Various other modifications will be apparent to those skilled in the art and will not be described in further detail here.

LIST OF ABBREVIATIONS

API Application Programming Interface
AS Application Server
AVP Attribute Value Pair CCA Credit-Control-Answer
CSFB Circuit Switched FallBack
eNB Evolved NodeB
GPRS General Packet Radio Service
HLR Home Location Register
HO Handover
HPLMN Home Public Land Mobile Network
HSS Home Subscriber Server
IBCF Interconnection Border Control Function
ICS IMS Centralized Services
iFC Initial Filter Criteria
IMS IP Multimedia Subsystem
IMSI International Mobile Subscriber Identifier
IP Internet Protocol
IWFI Interworking Function
LAI Location Area Identifier
LAU Location Area Update
LBO Local Breakout
LTE Long Term Evolution
MAA Multimedia-Auth-Answer
MAP Mobile Application Part
MAR Multimedia-Auth-Request
MCC Mobile Country Code
MGW Media Gateway
MME Mobility Management Entity
MSC Mobile Switching Centre
MSC-S MSC-Server
MSISDN Mobile Station International Subscriber Directory Number
MSRN Mobile Station Routing Number
NW Network
PCEF Policy Control Enforcement Function
PCRF Policy Control Rule Function
P-CSCF Proxy Call Session Control Function
PDN Packet Data Network
PGW PDN Gateway
PSAP Public Safety Answering Point
QoS Quality of Service
RAND RANDom number (used for authentication)
RAR Re-Auth-Request
SAA Server-Assignment-Answer
SAR Server-Assignment-Request
S-CSCF Serving Call Session Control Function
SGSN Serving GPRS Support Node
SGW Serving Gateway
SIP Session Initiation Protocol
SRES Signed RESponse (authentication value returned by the SIM or by the USIM in 2G AKA)
TAS Telephony Application Server
UDA User Data Answer
UDR User Data Request
UE User Equipment
URI Uniform Resource Identifier
URN Uniform Resource Name
VLR Visited Location Register
VoLTE Voice over LTE
VPLMN Visited Public Land Mobile Network While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. IP Multimedia Subsystem (IMS) Centralized Services Interworking Function (ICS-IWF) for supporting a registration procedure for an inbound roamer user equipment, 'UE', in a visited public land mobile network, 'VPLMN', the ICS-IWF comprising:
    a transceiver and a controller wherein the controller is configured to:
    control the transceiver to receive, from a serving Call Session Control Function, 'CSCF', of the VPLMN, a request for authentication information;
    retrieve the authentication information from a Home Subscriber Server 'HSS'/ Home Location Register 'HLR' of a home public land mobile network, 'HPLMN'; and
    control the transceiver to transmit the authentication information to the serving CSCF of the VPLMN for use in the registration procedure.

2. The ICS-IWF according to claim 1, wherein the transceiver is configured to receive the request for the authentication information in a Diameter protocol message.

3. The ICS-IWF according to claim 1, wherein the transceiver is configured to transmit the authentication information in a Diameter protocol message.

4. The ICS-IWF according to claim 1, wherein the controller is further configured to control the communication apparatus to act as a Home Subscriber Server, 'HSS', towards the serving CSCF of the VPLMN and to act as a visited location register, 'VLR', towards the communicator of the HPLMN.

5. The ICS-IWF according to claim 1, wherein the processor is configured to generate and store a subscription profile for the inbound roamer following receipt of the authentication information.

6. The ICS-IWF according to claim 1, wherein the processor is configured to generate at least one initial filter criteria, 'iFC', for invoking at least one application server, 'AS'.

7. The ICS-IWF according to claim 1, wherein the UE is attached to the VPLMN using a circuit switched, 'CS', communication technology and wherein the authentication information comprises CS authentication information.

8. A method performed by an IP Multimedia Subsystem (IMS) Centralized Services Interworking Function (ICS-IWF) for supporting a registration procedure for an inbound roamer user equipment, 'UE', in a visited public land mobile network, 'VPLMN', the method comprising:
- receiving, from a serving Call Session Control Function, 'CSCF', of the VPLMN, a request for authentication information;
- retrieving the authentication information from a Home Subscriber Server 'HSS'/ Home Location Register 'HLR'of a home public land mobile network, 'HPLMN'; and
- transmitting the authentication information to the serving CSCF of the VPLMN for use in said registration procedure.

9. A non-transitory computer-readable storage medium computer-implementable instructions that, when executed by a programmable IP Multimedia Subsystem (IMS) Centralized Services Interworking Function (ICS-IWF), cause the programmable ICS-IWF to perform the method of claim 8.

10. The ICS-IWF according to claim 2, wherein the Diameter protocol message is a Cx message.

* * * * *